US012115545B2

(12) United States Patent
Beaudoin et al.

(10) Patent No.: US 12,115,545 B2
(45) Date of Patent: Oct. 15, 2024

(54) INSTALLATION FOR AN ATOMIZER TO ATOMIZE A FLUID

(71) Applicant: EXEL INDUSTRIES, Epernay (FR)

(72) Inventors: Camilien Beaudoin, Paris (FR); Michel Colrat, Paris (FR); Didier Faure, Paris (FR); Guillaume Foubert, Paris (FR); Philippe Provenaz, Paris (FR)

(73) Assignee: EXEL INDUSTRIES, Epernay (FR)

( * ) Notice: Subject to any disclaimer, the term of this patent is extended or adjusted under 35 U.S.C. 154(b) by 304 days.

(21) Appl. No.: 17/194,301

(22) Filed: Mar. 7, 2021

(65) Prior Publication Data

US 2021/0283634 A1 Sep. 16, 2021

(30) Foreign Application Priority Data

Mar. 11, 2020 (FR) ........................................ 2002421

(51) Int. Cl.

| | |
|---|---|
| ***B05B 12/00*** | (2018.01) |
| ***B05B 3/10*** | (2006.01) |
| ***B05B 5/04*** | (2006.01) |
| ***B05B 13/04*** | (2006.01) |
| ***B05B 15/00*** | (2018.01) |
| ***B05C 11/10*** | (2006.01) |
| *B05B 15/555* | (2018.01) |

(52) U.S. Cl.

CPC .......... *B05B 12/004* (2013.01); *B05B 3/1035* (2013.01); *B05B 5/0407* (2013.01); *B05B 13/0431* (2013.01); *B05B 15/00* (2013.01); *B05C 11/1015* (2013.01); *B05B 5/04* (2013.01); *B05B 13/0452* (2013.01); *B05B 15/555* (2018.02)

(58) Field of Classification Search

None

See application file for complete search history.

(56) References Cited

U.S. PATENT DOCUMENTS 4,905,897 A * 3/1990 Rogers .................. B05B 12/082 239/172

6,391,392 B1 * 5/2002 Thome .................. B05B 5/1633 427/427.2

(Continued)

FOREIGN PATENT DOCUMENTS

DE 102012014212 A1 1/2014

WO WO-2020198322 A1 * 10/2020 ........... B05B 12/006

OTHER PUBLICATIONS

INPI Rapport de Recherche Preliminaire for Patent Application No. FR 2002421, Nov. 2, 2020, 2 pp.

*Primary Examiner* — Binu Thomas

(74) *Attorney, Agent, or Firm* — Soquel Group LLC

(57) ABSTRACT

An installation including an atomizer configured to atomize a fluid, a robot and a first station, the robot being configured to move the atomizer in a predetermined reference frame between at least a first position and a second position, the atomizer being configured to atomize the fluid when the atomizer is in the first position, a distance being defined between the atomizer and the first station, the distance when the atomizer is in the second position being strictly less than the distance when the atomizer is in the first position. The first station includes at least one sensor configured to measure at least one value of a parameter of the atomizer when the atomizer is in the second position.

12 Claims, 9 Drawing Sheets

(56) References Cited

U.S. PATENT DOCUMENTS

| | | | | |
|---|---|---|---|---|
| 8,567,694 | B2 * | 10/2013 | Herre | B05B 15/00 239/74 |
| 2002/0043567 | A1 * | 4/2002 | Provenaz | B05B 12/1454 239/1 |
| 2006/0169937 | A1 * | 8/2006 | Nolte | B05B 5/04 251/129.04 |
| 2010/0145516 | A1 * | 6/2010 | Cedoz | B05B 12/08 239/690 |
| 2011/0107966 | A1 * | 5/2011 | Yamada | B05B 5/0415 118/694 |
| 2014/0144545 | A1 * | 5/2014 | Tarantini | B05B 15/55 141/18 |
| 2016/0030962 | A1 * | 2/2016 | Sinnott | B05B 5/0422 239/703 |
| 2018/0008997 | A1 * | 1/2018 | Medard | B05B 3/1014 |
| 2018/0141070 | A1 * | 5/2018 | Reichler | B05B 13/0431 |
| 2021/0283638 | A1 * | 9/2021 | Beaudoin | B05B 13/0278 |
| 2022/0184646 | A1 * | 6/2022 | Yoshida | B05B 5/043 |

* cited by examiner

INSTALLATION FOR AN ATOMIZER TO ATOMIZE A FLUID

CROSS-REFERENCE TO RELATED APPLICATION

This application claims priority of French Patent Application No. 20 02421, filed on Mar. 11, 2020.

FIELD OF THE INVENTION

The present invention relates to an installation equipped with an atomizer. The present invention relates, moreover, to a method for measuring the values of at least one parameter of such an atomizer.

BACKGROUND OF THE INVENTION

Many fluid atomizing installations include an atomizer, at least one part of which is designed to be brought to a high electrical potential during atomizing. Thus, the difference in electrical potential between the part to be coated with the fluid and the atomizer tends to favor the projection of the fluid droplets projected to the part, since the droplets tend to become electrically charged at the atomizer and follow the electric field lines between the atomizer and the part. The result is an increase in atomizer efficiency, as the amount of fluid that does not reach the part is reduced.

However, the high electrical potentials to which the atomizer head is exposed require electrical insulation between the atomizer head and other parts of the atomizing installation to prevent potentially dangerous arcing. Consequently, the atomizer is equipped with the minimum necessary components and the electrical connections between the atomizer head and the robot on which the atomizer is mounted are arranged in such a way as to isolate the atomizer head from the rest of the installation while allowing a potential difference to be imposed between these elements. When the atomizer is not in operation, the electrical potential is returned to ground so that the atomizer can be moved closer to other parts of the installation or manually operated without risk.

However, the atomizer itself is a complex device including many moving parts such as a bowl rotated at high speed by a turbine, valves to start and stop the supply, to the bowl, of fluid to be atomized, or even a skirt generating precisely controlled air jets to shape the fluid jet optimally. All of these elements must work together to provide high efficiency fluid projection, and the efficiency of the projection rapidly decreases if one or other of these elements are damaged. In addition, there are many external factors that can affect atomizer efficiency and/or the quality of the resulting parts even if the parts making up the atomizer are not damaged.

In general, and in particular because of the high voltage operation, it is difficult to evaluate the performance of the atomizer when it is in operation. As a result, maintenance of the atomizer is made difficult, especially because minor defects or damage are not easily detected, making it impossible to intervene quickly before the negative consequences of these defects are too great. As a result, it is necessary to plan periodic maintenance with a high frequency, which limits the availability of the atomizer. Otherwise, the average quality of the products in the manufacture of which the fluid is used is diminished when the undetected defects of the atomizer result in defects of these products.

Even atomizers whose electrical potential does not vary during operation are complex and often difficult to monitor, so they tend to suffer from similar limitations.

Therefore, there is a need for a fluid atomizer with greater availability.

SUMMARY OF THE DESCRIPTION

For this purpose, an installation is proposed including a atomizer configured to atomize a fluid, a robot and a first station, the robot being configured to move the atomizer in a predetermined reference frame between at least a first position and a second position, the atomizer being configured to atomize the fluid when the atomizer is in the first position, a distance being defined between the atomizer and the first station, the distance when the atomizer is in the second position being strictly less than the distance when the atomizer is in the first position, the first station includes at least one sensor configured to measure at least one value of a parameter of the atomizer when the atomizer is in the second position.

The invention allows the state of the atomizer to be monitored on a regular basis during its operation, simply by moving the atomizer to its second position. As a result, it is easier to detect a dysfunction (or "fault") of the atomizer, including small scale dysfunctions that would otherwise be difficult to detect. As a result, the need for periodic atomizer maintenance is limited, and atomizer availability is improved while providing better average atomizer quality than is possible with state-of-the-art atomizers.

According to particular embodiments, the atomizer has one or more of the following features, taken alone or depending on any technically possible combination:

- the first station has a ring delimiting an opening surrounded by the ring, the atomizer being at least partially accommodated in the opening when the atomizer is in the second position.
- the ring includes an inner wall delimiting the opening, at least one sensor being attached to the inner wall.
- the atomizer is in contact with the first station when the atomizer is in the second position.
- the atomizer includes a skirt intended to generate conformation air flows of the atomized fluid, the skirt being in contact with the first station when the atomizer is in the second position.
- the atomizer includes a turbine, a fluid injector and a bowl intended to be driven in rotation by the turbine to atomize the fluid when the fluid is injected into the bowl by the injector, the installation including a control module configured to control a rotation of the bowl when the atomizer is in the second position. 10
- at least one sensor is a microphone.
- at least one sensor is an accelerometer configured to measure a value of an acceleration of the first station when the atomizer is in the second position, the atomizer being in contact with the first station when the atomizer is in the second position.
- the installation including a control module configured to detect an atomizer defect, in particular an unbalance of the bowl, based on values measured by a sensor during a bowl rotation.
- the atomizer further includes at least one valve including a needle that can be moved between two positions, at least one sensor at the first station being configured to measure a position of the valve needle.

the installation includes a control module configured to calculate a time for the needle to move between its two positions from the measured needle position values.

the first station is further configured to clean the atomizer with a liquid, such as a solvent, when the atomizer is in the second position.

the installation has a second station, separate from the first station, the robot being further configured to move the atomizer from one of the first and second positions to a third position, the second station being configured to clean the atomizer with a liquid, such as a solvent, when the atomizer is in the third position.

the first station is fixed in the predetermined reference frame.

at least one sensor is configured to measure a value of a temperature of the atomizer.

at least one of the sensors is configured to measure a value of an electrical potential of the atomizer.

A method is also proposed for measuring at least one parameter of an atomizer configured to atomize a fluid, the method being implemented by an installation including the atomizer, a robot and a first station, the method including operations of:

atomizing the fluid from the atomizer, the atomizer being in a first position, and movement of the atomizer by the robot between the first position and a second position, a distance being defined between the atomizer and the first station, the distance when the atomizer is in the second position being strictly less than the distance when the atomizer is in the first position, the first station including at least one sensor and the method includes a measuring operation by the sensor of at least one value of a parameter of the atomizer when the atomizer is in the second position.

According to particular embodiments, the method includes one or more of the following features, taken alone or according to any technically possible combination:

during the measuring operation, an electric potential of the atomizer is modified from a first value to a second value strictly higher than the first value, at least one sensor measuring the second value of the electric potential during the measuring operation.

the atomizer includes a bowl and a turbine configured to drive the bowl in rotation, the measuring operation including rotation of the bowl and detection of a defect in the bowl from values measured by at least one sensor during the rotation of the bowl.

the measuring operation involves acquisition of a noise emitted by the bowl during rotation of the bowl and detection of the defect from the acquired sound.

the atomizer is in contact with the first station during the measurement operation, the measuring operation including the measurement of at least one acceleration value of the first station during the rotation of the bowl and the detection of the defect from the measured acceleration value(s).

BRIEF DESCRIPTION OF THE DRAWINGS

Features and advantages of the invention will appear when reading the following description, given only as a non-limiting example, and made with reference to the attached drawings, in which.

DETAILED DESCRIPTION

Figure 1:
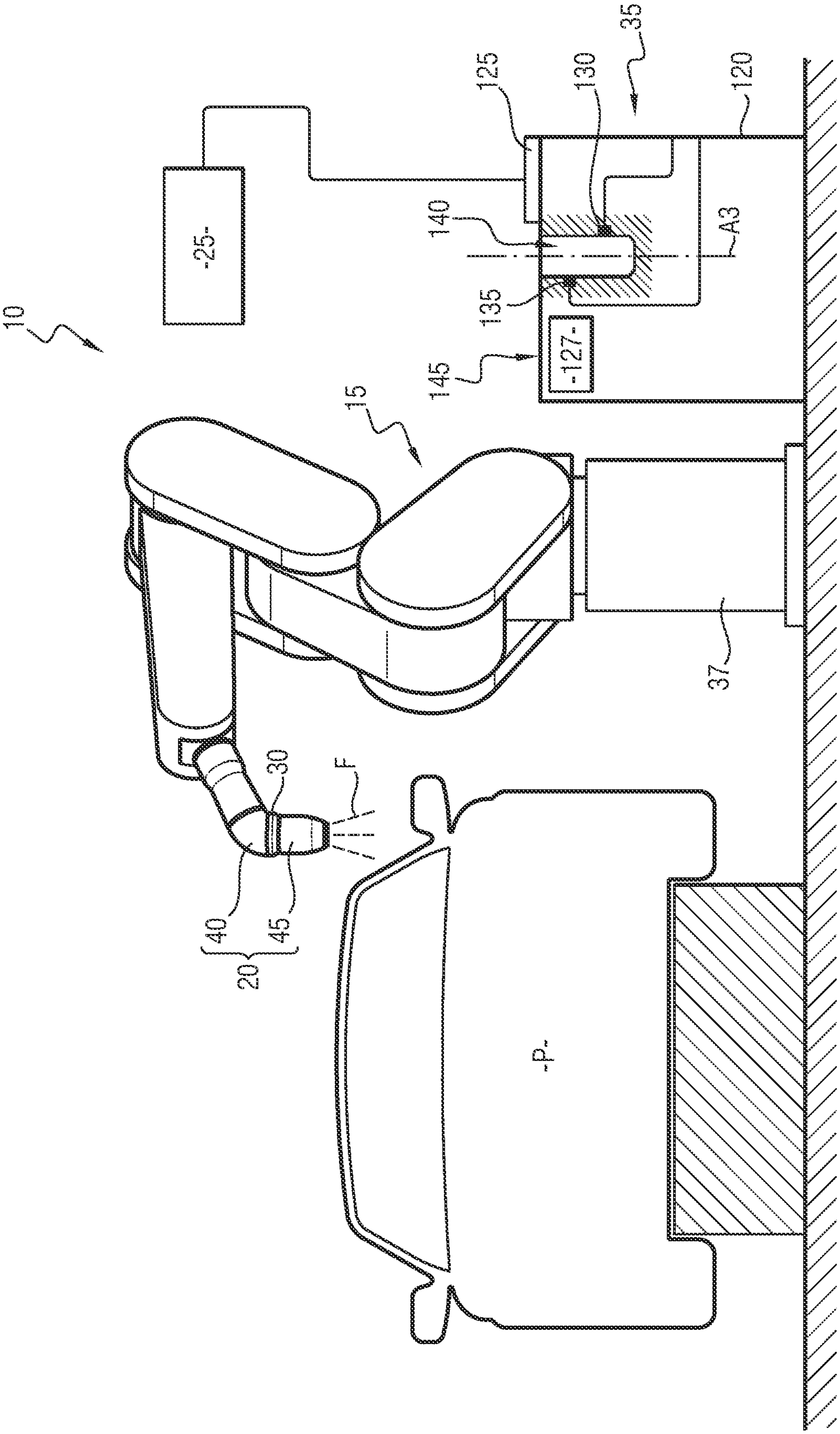
FIG. 1 is a schematic representation of a first example of a fluid projection installation according to the invention, including an atomizer.
Figure 2:
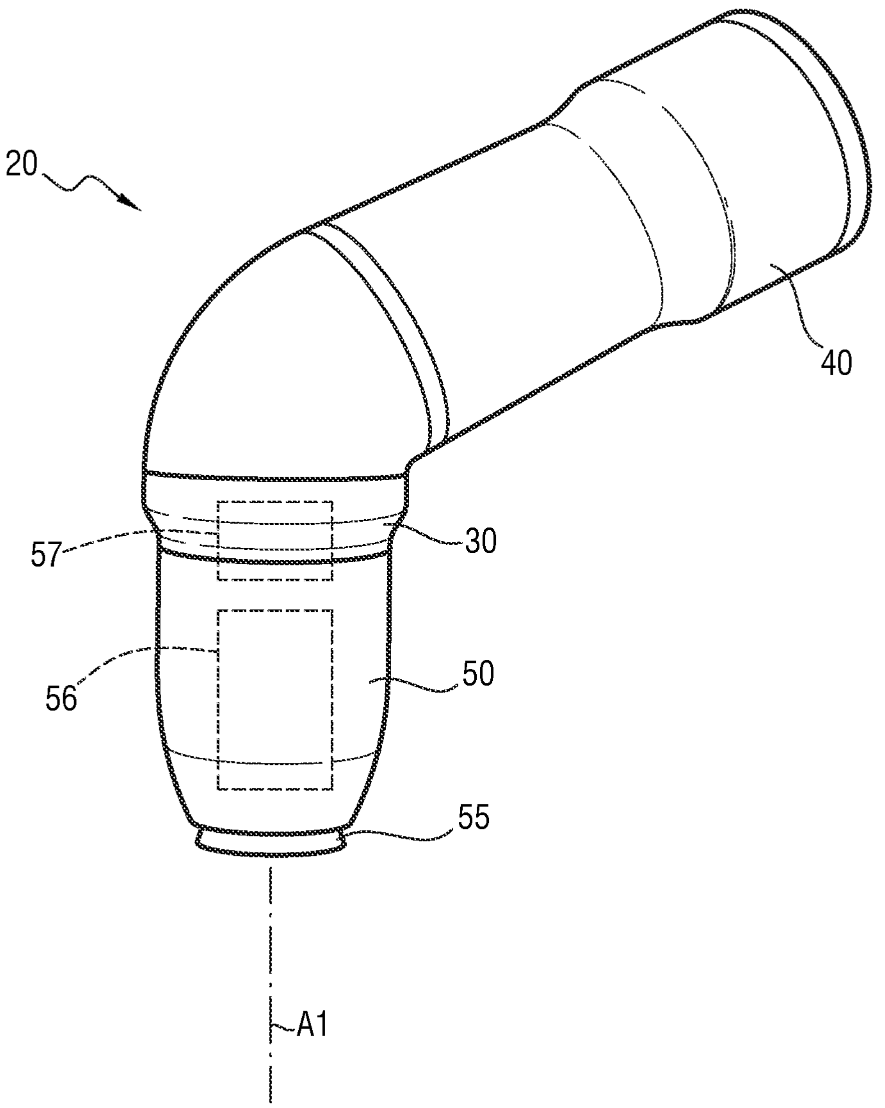
FIG. 2 is a schematic representation of an example atomizer from FIG. 1, including a measurement module.
Figure 3:
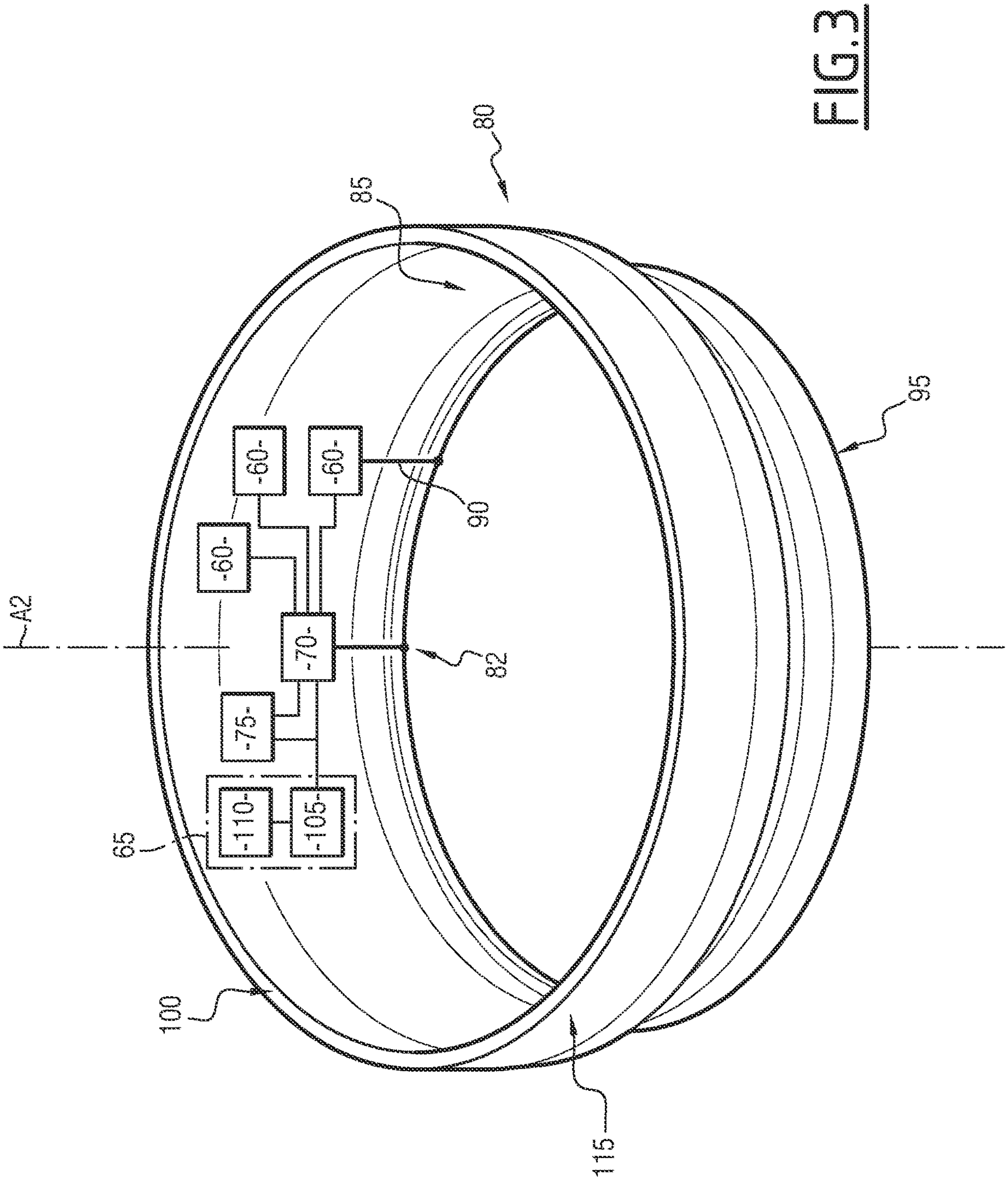
FIG. 3 is a schematic representation of an example of a measurement module from FIG. 2.

A first example of an installation 10 for the projection of a fluid is shown partially in FIG. 1.

Installation 10 includes a robot 15, an atomizer 20, a control module 25 of robot 15, and optionally a first station 35.

The installation 10 is configured to atomize a first fluid F.

The first fluid F is, in particular, a coating product such as paint or varnish. For example, the first fluid F is a paint or varnish intended to at least partially, cover a panel P, of a car body.

Robot 15 supports atomizer 20. In particular, robot 15 is configured to move atomizer 20 in space; in particular to orientate atomizer 20 in a plurality of directions in space.

In particular, robot 15 is configured to move atomizer 20, within a predetermined reference frame, between an operating position and a rest position, sometimes also called the cleaning position.

The reference frame is a fixed reference frame in relation to a location in installation 10. The reference frame is, for example, the terrestrial reference frame.

In particular, robot 15 is configured to move atomizer 20 between the operating position and the rest position relative to a base 37 of robot 15.

A distance between atomizer 20 and first station 35 when atomizer is in the operating position is strictly greater than a distance between atomizer 20 and first station 35 when atomizer 20 is in the rest position.

Robot 15 is, for example, an articulated arm with actuators to rotate the individual segments of the arm relative to each other to move and orientate atomizer 20 in space.

In addition, robot 15 is designed to supply atomizer 20 with an electrical voltage or current and with at least a second fluid such as a gas or solvent and a flow of the first fluid F to be atomized.

Alternatively, atomizer 20 includes a reserve of the first fluid F, and therefore does not require a supply of the first fluid F via robot 15.

The gas G is, for example, air.

Robot 15 is configured to move atomizer 20 in space and/or to orientate atomizer 20 in a plurality of directions in space based on the control messages received from control module 25. In addition, robot is configured to supply atomizer 20 with electrical voltage or current and/or the first or the first and second fluid(s) based on corresponding control messages.

Atomizer 20 includes, in a manner known per se, a base 40 and an atomizer head 45. Atomizer 20 also includes a measurement module 30.

According to one embodiment, atomizer 20 incudes a fluid reservoir F in a manner known per se, this reservoir being, for example, integrated into atomizer head 45 or in base 40.

Base 40 has a first face which is connected to robot 15 and a second face, also referred to as the connecting face, to which atomizer head 45 is attached.

Base 40 has at least one duct through it that can supply atomizer head 45 with a fluid, such as the fluid F to be atomized. For example, base 40 is traversed from the first face to the connecting face by a plurality of ducts leading to the connecting face.

At least one duct is configured to supply atomizer head 45 with the fluid F to be atomized. At least one other duct is configured to supply atomizer head 45 with gas G. Optionally, at least one duct is configured to supply atomizer head 45 with a liquid such as a solvent.

In a manner known per se, base 40 includes, for example, at least one valve configured to close or open one of the ducts in base 40. At least one valve is, for example, located on the connecting face.

Base 40 is, in addition, configured to supply atomizer head 45 with electrical power. For example, the connecting face has an electrical conductor passing through it that is configured to be electrically connected to atomizer head 45 in a manner known per se.

For example, base 40 is configured to impose an electrical potential difference between the first face and the electrical conductor.

In particular, base 40 is configured to change a value of the electrical potential of the electrical conductor between a first value and a second value.

The first electrical potential value is, for example, zero. In this case, the first electrical potential value is equal to an electrical potential value of an electrical ground of installation 10.

The second electrical potential value is strictly higher than the first electrical potential value. A difference between the first and second electrical potential value is, for example, greater than or equal to 10 kV, for example, between 20 kV and 90 kV. It should be noted that the second value may vary, for example during a trajectory of robot 15.

Base 40 includes, for example, an electrical transformer circuit able to generate an electrical voltage equal to the second value of electrical potential between the electrical conductor and ground from an electrical supply voltage.

Atomizer head 45 is configured to atomize fluid F. In particular, atomizer head 45 is configured to atomize fluid F when atomizer head is brought to the second electrical potential value.

In a manner known per se, atomizer head 45 includes a skirt 50, a bowl 55, an electrical connector and a turbine 56.

In a known manner, atomizer head 45 is configured so that all parts of atomizer head 45 have the same electrical potential. In particular, the electrical potential value of atomizer head 45 is equal to the electrical potential value of the electric conductor of base 40. Thus, atomizer head is configured to be brought, by base 40, to the first value and second value of the electrical potential, according to the electrical potential value imposed by base 40 on the electric conductor.

Skirt 50 is configured to receive from base 40 a flow of gas G, and to generate from the received flow a set of confirmation flows of the projected fluid F.

Bowl 55 is configured to be driven in rotation by turbine 56 around an axis A1. Bowl 55 is configured to generate a flow of fluid F when fluid F is injected into the bottom of bowl 55 during rotation of bowl 55. The electrical connector is electrically connected to skirt 50, bowl 55, turbine 56, and the electrical conductor of base 40.

Control module 25 is configured to control a movement of atomizer by robot 15.

Control module 25 is, in addition, configured to control a supply to atomizer head 45 with a flow of fluid F and/or with a flow of gas G and/or with a flow of liquid. For example, control module 25 is configured to control the opening and/or closing of each valve on base 40.

In addition, control module 25 is configured to control the change, by base 40, of the electrical potential of atomizer head 45 from the first value to the second value.

For example, control module 25 includes a processor and memory with software instructions that, when executed on the processor, form a robot 15 motion control module, an atomizer head 45 supply control module, and a control module to change the electrical potential. Alternatively, at least one of these modules is realized as a dedicated integrated circuit, or even programmable logic component.

Control module 25 incudes, for example, a human-machine interface, for example, a screen, a keyboard and/or mouse, to enable transmission of information and/or instructions between control module and an operator.

Control module 25 is, for example, a device remote from robot 15. In particular, control module 25 is fixed in the reference frame.

For example, control module 25 is located outside an enclosure defining a volume containing robot 15.

Measurement module 30 is configured to measure at least one value of a parameter of atomizer 20. Measurement module 30 is, in addition, configured to transmit to a remote device, for example to control module 25, at least one message generated, according to the measured value(s).

Measurement module 30 includes at least one sensor 60, a power supply 65, an electronic control module 70, and a communication module 75.

In the first example, measurement module 30 is, for example, attached to atomizer 20. In this case, measurement module 30 includes, in addition, a first housing 80.

Measurement module 30 is, for example, at least partially housed between base 40 and atomizer head 45.

In particular, measurement module 30 is traversed by the duct(s) and the electrical conductor connecting base 40 to atomizer head 45.

According to an embodiment, measurement module 30 at least partially surrounds the connecting face around a second axis A2. In this case, first housing 80 is in the form of a ring at least partially surrounding the connecting face.

For example, the ring completely surrounds the connection surface around the second axis A2, i.e., over 360 degrees. Alternatively, the ring partially surrounds the connection surface. For example, the ring is an annular portion that surrounds the connecting face for 240 degrees or less.

At least one element from a sensor 60, power supply 65, control module 70, and/or communication module 75 is, for example, encapsulated in a sealed manner in ring 80 when measurement module is fixed to atomizer head 45.

"Encapsulate" means that ring 80 is associated with atomizer head and/or base 40 to prevent fluid splashes from reaching any of the above elements from outside measurement module 30.

It should be noted that embodiments in which ring 80 does not provide a seal between the inside and outside of ring 80 are also possible.

In particular, ring 80 surrounds at least one element of a sensor 60, power supply 65, control module 70, and/or communication module 75, in particular, each sensor 60, power supply 65, control module 70, and communication module 75 in a plane perpendicular to the second axis A2.

Alternatively, at least one element from, a sensor 60, power supply 65, control module 70, and/or communication module 75 is embedded in a mass of electrically insulating material, in particular material forming ring 80.

The second axis A2 is perpendicular to the connecting face and is, for example, merged with axis A1.

Base 40 and atomizer head 45 are, for example, aligned along axis A2.

A reference point for the electrical potentials of measurement module 30 is defined.

The reference point is the point from which the electrical potential of each element of measurement module 30, in particular, each sensor 60, power supply 65, electronic control module 70, and communication module 75 are defined.

The reference point is, in particular, the point at which the various electrical currents flowing through measurement module 30 return.

Such a reference point is sometimes referred to as "ground". In the majority of electrical installations, the reference point is ground.

In other words, measurement module 30 is configured to operate with the reference point as electrical ground.

For example, each sensor 60, power supply 65, electronic control module 70, and communication module 75 are each connected electrically to the reference point, either directly or indirectly.

Measurement module 30 is configured so that the reference point is electrically connected to atomizer head 45. In particular, the reference point is equipotential with the electrical conductor of base 40. I.e., the reference point of measurement module 30 has the same electrical potential as atomizer head 45, and in particular the electrical conductor of base 40.

In particular, the reference point is electrically connected to skirt 50.

For example, measurement module 30 includes an electrical contact 82 resting against atomizer head 45, in particular against skirt 50. It should be noted that there are embodiments in which the reference point is electrically connected to an element of atomizer head other than skirt 50, for example turbine 56 or another electrically conductive element.

In this case, electrical contact 82 acts as a reference point for the electrical potential of measurement module 30.

Electrical contact 82 is, for example, electrically connected to control module 70. It should be noted that the common reference point is defined by the various electrical circuits that make up measurement module 30. In addition, embodiments wherein the common reference point is connected to a sensor 60 or even to another element of measurement module 30, are equally possible.

Thus, measurement module 30 is configured to operate by considering as electrical ground, the electrical potential imposed by base on atomizer head 45.

Each sensor 60 is, for example, attached to an inner face 85 of first housing 80. In particular, each sensor 60 is surrounded by inner face 85 in a plane perpendicular to axis A2.

Each sensor 60 is configured to measure the values of an atomizer parameter 20. In addition, each sensor 60 is configured to transmit the measured values to control module 70.

In particular, each sensor 60 is configured to measure and transmit the values when atomizer 20 is brought to the second electrical potential value, for example while bowl 55 is rotating.

Each sensor 60 is, for example, selected from a list consisting of: an accelerometer, a temperature sensor, a microphone, and a valve position sensor of atomizer 20.

It should be noted that other examples of sensors 60 may also be integrated into measurement module 30.

Each accelerometer is configured to measure an acceleration of atomizer 20. For example, each accelerometer is configured to measure the acceleration values of the atomizer 20 in one direction. Alternatively, the same accelerometer is configured to measure the acceleration values of the atomizer in two or three directions perpendicular to each other.

In particular, at least one accelerometer is configured to measure an acceleration of atomizer 20 in a direction perpendicular to the axis A1 of rotation of bowl 55. The measurement of acceleration in this direction allows an imbalance of bowl 55 to be detected, indicative of an imbalance of bowl 55 or a defect of turbine 56.

The measurement of acceleration according to one or two other directions allows the detection of too high an acceleration of atomizer 20 during its movement and likely to cause a stall of bowl 55, thus giving an indication of a correction to be made, for example by reducing the acceleration that caused the stall or by modifying a trajectory of atomizer 20.

Each microphone is configured to measure values of noise generated by atomizer 20. The noise is, for example, a noise generated by bowl 55 during rotation of bowl 55.

Each temperature sensor is configured to measure a temperature of atomizer 20.

"Atomizer 20 temperature" is defined as a temperature of an element of atomizer 20, for example, a temperature of atomizer head 45. In particular, each temperature sensor is configured to measure a temperature of skirt 50. Alternatively, at least one temperature sensor is configured to measure a temperature of turbine 56, air exhaust duct or another element of atomizer 20.

Each temperature sensor includes, for example, a thermocouple 90 in contact with atomizer head 45, particularly in contact with skirt 50. Thermocouple 90 is, for example, level with an end face 95 of first housing 80. However, other types of temperature sensors are also possible.

Each position sensor is configured to measure a position of a valve, for example to measure a stroke of a valve needle 57 integrated in the connecting face between base 40 and head 45 of atomizer 20.

End face 95 defines first housing 80 along axis A2 and is opposite atomizer head 45. In particular, end face 95 rests against skirt 50.

Another end face 100 defines first housing 80 along axis A2 and is opposite base 40.

Power supply 65 is configured to supply power to control module 70, communication module 75, and each sensor 60.

Power supply 65 includes, for example, an energy storage device 105 and a charging device 110.

Storage device 105 is configured to store electrical energy. For example, storage device 105 includes a capacitor. The capacitor is, for example, a supercapacitor.

Note that other types of electrical energy storage devices are also possible, such as a battery, whether rechargeable or not.

Charging device 110 is configured to receive energy from a device external to measurement module 30 and to charge storage device 105 with the received energy.

Charging device 110 is, in particular, an inductive charging unit. For example, charging device 110 includes an antenna configured to receive electromagnetic radiation and to generate a potential difference from the received radiation. Charging device 110 is then configured to impose the potential difference on two terminals of the measurement unit 105.

For example, the antenna of charging device 110 has an electrically conductive winding.

Alternatively, charging device 110 includes two connection terminals carried by an external face 115 of first housing 80, charging device 110 being configured to transmit to the terminals of measurement unit 105 an electrical potential difference imposed on the two terminals of charging device 110.

Control module 70 is configured to control the acquisition of values of at least one parameter of atomizer 20 by each sensor 60.

Control module 70 is configured to control the acquisition of at least one value, in particular the atomizer acceleration values, while atomizer head 45 is raised to the second electrical potential value.

In addition, control module 70 is configured to control the acquisition of at least one value, in particular atomizer acceleration values, during a bowl rotation.

In addition, control module 70 is configured to control acquisition of at least one value, in particular the atomizer acceleration values, during a movement of atomizer 20 by robot 15.

Control module 70 is configured to generate a diagnostic message from at least one measured value and to transmit the diagnostic message to communication module 75.

For example, control module 70 is configured to insert at least one measured value into the diagnostic message. In particular, control module 70 is configured to insert a measured temperature value into the diagnostic message.

The measured temperature value is, for example, measured at the end of a fluid F atomizing operation.

Alternatively, or in addition, control module 70 is configured to calculate at least one diagnostic value from a set of measured values and to insert the diagnostic value(s) into the diagnostic message.

Each diagnostic value is, for example, a value of an amplitude or frequency of a frequency component, the frequency component being a frequency component of an acceleration or noise measured by the microphone.

Each diagnostic value is, for example, calculated from at least one coefficient of a Fourier transform.

The Fourier transform is, for example, a Fourier transform of the measured acceleration values, or of a noise measured by the microphone.

Alternatively, the Fourier transform is a Fourier transform of velocity or displacement values of atomizer 20, these velocity or displacement values being obtained by integration of the measured acceleration values.

According to another variant, each diagnostic value is a coefficient of a Fourier transform of the measured acceleration values, or of a noise measured by the microphone.

Alternatively, or in addition, at least one diagnostic value is, for example, a maximum acceleration value of atomizer 20.

Control module 70 is, for example, configured to calculate the values of coefficients and/or frequency and/or amplitude by fast Fourier transform. The Fast Fourier Transform, often referred to as FFT, is an algorithm for calculating a discrete Fourier transform.

According to one embodiment, the diagnostic message includes a set of diagnostic values acquired during a rotation of bowl 55.

Alternatively, or in addition, at least one diagnostic value is, for example, an identifier of a dysfunction of atomizer 20 or a shock to atomizer 20, this dysfunction or shock being detected by control module 70 on the basis of the measured values. For example, the diagnostic message includes an identifier of the dysfunction or shock and an indicator of a time instant, for example, a date and associated time, of the dysfunction or shock.

For example, control module 70 includes a processor and memory with software instructions which, when executed on the processor, form an acquisition control module of at least one value by a sensor and a module for generating the diagnostic message. Alternatively, at least one of these modules is realized in the form of dedicated integrated circuits or programmable logic components.

Control module 70, for example, includes an internal clock. The term "clock" refers to any device that enables control module 70 to measure the passage of time. An example of such a clock is a circuit generating a periodic signal associated to a counter for the number of signal periods.

The clock is, for example, capable of allowing control module 70 to directly measure an elapsed time. In this case, control module 70 is able to associate each event, for example each value measured by a sensor, to a time.

Alternatively, the clock may be used to enable control module 70 to count a number of events, for example to detect a maximum of a periodic signal, and to associate each measured value with an identifier (for example, a number) of one of the events or an interval between two of the events. In this case, control module 70 is not able to directly measure the passage of time, but an external device can establish a correspondence between each identifier and the corresponding time.

Communication module 75 is, particularly, configured to transmit the diagnostic message to a device separate from atomizer 20. The separate device is, for example, first station 35.

According to a variant, the separate device is control module 25. Communication module 75 is, particularly, configured to transmit the diagnostic message via radio frequency communication.

Radio frequency communication is the transmission of messages via a signal including at least one radio frequency electromagnetic wave. Radio-frequency electromagnetic waves are electromagnetic waves with a frequency between 3 KHz and 3 GHZ.

For example, communication module 75 is capable of transmitting or receiving an electromagnetic wave with a frequency greater than or equal to 13.553 MHz and less than or equal to 13.567 MHZ.

Preferably, communication module 75 is able to transmit and receive an electromagnetic wave with a frequency greater than or equal to 13.553 MHz and less than or equal to 13.567 MHZ.

Advantageously, communication module 75 uses a Near-Field Communication protocol. Near-Field Communication is a short-range, high-frequency wireless communication technology that allows exchange of information between devices up to a distance of approximately 10 centimeters. NFC technology is an extension of ISO/IEC 14443.

Alternatively, communication module 75 is able to transmit or receive an electromagnetic wave with a frequency greater than or equal to 2400 MHz and less than or equal to 2483.5 MHz.

Preferably, communication module 75 is able to transmit and receive an electromagnetic wave with a frequency greater than or equal to 2400 MHz and less than or equal to 2483.5 MHz.

Advantageously, communication module 75 uses a Bluetooth communication protocol. BLUETOOTH® is a communication standard that allows bi-directional exchange of data over very short distances. The standards defining Bluetooth protocols are defined by the Bluetooth Special Interest Group.

According to another variant, communication module 75 uses another type of protocol, for example a Wi-Fi protocol. Wi-Fi®, also spelled wifi, is a set of wireless communication protocols governed by the IEEE 802.11 group of standards (ISO/IEC 8802-11).

According to another variant, communication module 75 is configured to transmit the diagnostic message via an electrical signal. For example, communication module 75 includes at least one electrical contact that opens on outer face 115 of first housing 80 and is configured to connect to a corresponding electrical contact on first station 35.

It should be noted that embodiments in which communication module 75 is not present are also possible, for example in those cases where atomizer 20 would be dismantled on a regular basis in order to extract the measured values and/or values that would otherwise be contained in the diagnostic message.

First station 35 is fixed in the reference frame. For example, first station 35 is fixed in relation to base 37 of robot 15.

First station 35 is configured to receive the diagnostic message.

In addition, first station 35 is, in a manner known per se, configured to clean atomizer 20 when atomizer 20 is in the rest position.

Alternatively, or in addition, first station 35 is configured to fill the reserve of fluid F of atomizer 20.

It is noted that embodiments in which first station 35 does not allow cleaning and/or filling of atomizer 20 are also considered. For example, first station 35 has the sole function of receiving the diagnostic message.

First station 35 includes a second housing 120, a receiver module 125, a refill module 127, at least one cleaning nozzle 130, and a refill connector 135.

Second housing 120 defines an opening 140 for receiving atomizer 20. When atomizer 20 is in the rest position, atomizer 20 is at least partially housed in opening 140.

Opening 140 extends, for example, along an axis A3, from an upper face 145 of first station 35. When atomizer 20 is in the rest position, axis A1 is, for example, parallel to axis A3.

Receiver module 125 is configured to receive the diagnostic message and to transmit the diagnostic message to a device configured to allow the exchange of information with an operator, this device being, for example, control module 25. Receiver module 125 and the device to which the diagnostic message is transmitted by receiver module 125 then form a device for evaluating the diagnostic message.

For example, receiver module 125 has an antenna configured to receive the diagnostic message.

Receiver module 125 is, for example, carried by upper face 145 of second housing 120. In particular, receiver module 125 is opposite measurement module 30 when atomizer 20 is in the rest position.

When atomizer 20 is in the rest position, a distance between receiver module 125 and communication module 75 is less than or equal to 15 centimeters.

Alternatively, receiver module 125 includes at least one electrical contact configured to contact an electrical contact on measurement module 30 when atomizer 20 is in the rest position to receive the diagnostic message as an electrical signal.

Recharge module 127 is configured to recharge storage device 105 when atomizer 20 is in the rest position.

For example, recharge module 127 is configured to generate a variable electromagnetic field that will generate an electrical potential difference at the terminals of charging unit 110. For example, charging module 127 includes an electrically conductive winding in which charging module 127 is configured to circulate an alternating electric current to generate the variable electromagnetic field.

A distance between charging module 127 and charging unit 110, when atomizer 20 is in the rest position, is less than or equal to 5 centimeters.

Many types of induction charging modules 127 are used for many applications such as cell phone charging.

In a manner known per se, cleaning nozzle 130 is configured to clean atomizer head 45 when atomizer 20 is in the rest position, particularly by atomizing a flow of liquid, particularly a solvent, onto atomizer head 45.

Filling connector 135 is, in a known manner, configured to inject into atomizer 20 fluid F reserve when atomizer 20 is in the rest position.

Figure 4:
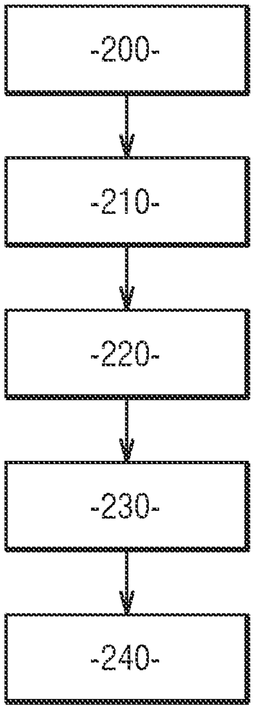
FIG. 4 is a flowchart of the operations of a method implemented by the installation of FIG. 1.

The operation of installation 10 will now be explained with reference to FIG. 4, which shows a flow chart of operations in a method for measuring at least one parameter of atomizer 20.

The method includes an initial operation 200, a first displacement operation 210, an atomizing operation 220, a second displacement operation 230, and a transfer operation 240.

In initial operation 200, atomizer 20 is in the rest position.

In initial operation 200, atomizer 20 shows the first electrical potential value.

In first displacement operation 210, control module 25 controls a displacement of atomizer 20 to the operating position.

In addition, control module 70 controls the measurement of acceleration values, by the accelerometer(s), of atomizer 20 during the movement of atomizer 20.

For example, each accelerometer acquires acceleration values with a time period between 500 Hz and 5 kHz, for example equal to 3 kHz.

Each value measured by a sensor 60 is transmitted to control module 70 and stored in the memory of control module 70.

During first displacement operation 210, for example after movement of atomizer 20, control module 25 controls the change of the electrical potential of atomizer head 45, via base 40, from the first value to the second value.

In atomizing operation 220, atomizer 20, in its operating position, atomizes fluid F.

In atomizing operation 220, atomizer head 45 shows the second electrical potential value.

For example, in a manner known per se, a potential difference equal to the second electrical potential value is imposed between an object P that is to be coated with fluid F and atomizer head 45. In particular, object P is grounded.

In order to atomize fluid F, bowl 55 is rotated around its axis and fluid F is injected into bowl 55 to generate fluid jet F. In addition, the skirt generates gas jets G intended to shape fluid jet F.

During atomizing operation 220, control module 70 controls acquisition of at least one value by at least one sensor 60.

For example, control module 70 controls acquisition of a set of acceleration values of atomizer 20 by one or more accelerometer(s) during rotation of bowl 55.

Alternatively, or in addition, control module 70 controls acquisition of values of a noise emitted by bowl 55 during its rotation.

Alternatively, or in addition, during atomizing operation 220, one of sensors 60 measures position values of the needle position of the corresponding valve.

For example, in atomizing operation 220, the valve needle is switched between an open configuration in which fluid F, or air, may flow through the valve, and a closed configuration in which the valve is sealed against fluid F or air. Sensor 60 measures needle position values during needle switching.

In addition, control module 70 controls acquisition of a set of temperature values from atomizer head 45, particularly from skirt 50. The temperature values are, for example, acquired with a time period between 1 second and 2 minutes. In particular, at least one temperature value is acquired during each painting cycle.

Each value measured by a sensor 60 is transmitted to control module 70 and stored in the memory of control module 70.

In second movement operation 230, control module 25 controls movement of atomizer 20 by robot 15 to the rest position.

In addition, control module 25 controls the change of the electrical potential of atomizer head 45 from the second value to the first value. For example, the electrical potential of atomizer head 45 reaches the first value before movement of atomizer 20, or even during movement of atomizer 20 to the rest position.

In addition, control module 70 controls the acquisition of acceleration values during movement of atomizer 20 from the operating position to the rest position.

Optionally, at least one temperature value is acquired during second movement operation 230.

Each value measured by a sensor 60 is transmitted to control module 70 and stored in the memory of control module 70.

During transfer operation 240, the diagnostic message is transmitted directly from communication module 75 to receiver module 125. According to a variant, the diagnostic message is transmitted directly from communication module 75 to control module 25.

For example, the diagnostic values are generated by control module 70 from values measured in transfer operation 240. Alternatively, at least one diagnostic value is generated in first movement operation 210, atomizing operation 220, and/or second movement operation 230. According to an embodiment, calculation of diagnostic values is carried out continuously, whereby each new measured value is included in the calculation of diagnostic values as soon as possible after acquisition of the value.

At least one diagnostic value is, for example, a maximum value among the acceleration values acquired during each of movement operations 210 and 230.

Each value stored in control module 70 is time-stamped; i.e., associated to a value acquisition date or an identifier of the acquisition date, which control module 25 is configured to convert to the acquisition date.

The diagnostic values include, in addition, a set of amplitude values of frequency components acquired during rotation of bowl 55. Frequency components are frequency components of the measured acceleration and/or noise.

For example, the diagnostic values include, for a set of predetermined frequency components, an amplitude value of each frequency component. The set of amplitude values then forms a frequency spectrum of the acceleration of atomizer 20 or the noise emitted by atomizer 20 during rotation of bowl 55.

Alternatively, the diagnostic values include, for each of a set of frequency ranges, a value showing the amplitudes of the frequency components of the frequency range under consideration. The representative value is, for example, an average of the amplitudes of the frequency components of the frequency range in question.

Alternatively, or in addition, diagnostic values include a frequency value of a frequency component of the measured acceleration, the frequency value being the value related to the highest amplitude.

The set of diagnostic values includes, for example, a minimum and a maximum value of the measured temperature values.

Alternatively, or in addition, the diagnostic values include, for example, a value for duration of a valve switchover (also called "response time") or a value for needle movement between the open and closed valve configurations, which are calculated by control module 70.

"Switching time" means, for example, duration of the needle movement between the open and closed configuration of the valve or vice versa.

The diagnostic message is transmitted from receiver module 125 to control module 25.

In transfer operation 240, storage device 105 is electrically charged by charging module 127.

In addition, atomizer head 45 is cleaned by first station 35 during transfer operation 240. Optionally, fluid reserve F of atomizer 20 is filled via filling connector 135.

Control module 25 compares, for example, the frequency spectrum contained in the diagnostic values with a reference spectrum and detects a dysfunction of bowl 55, for example an imbalance of bowl 55, from the comparison. For example, if a difference between an amplitude value contained in the diagnostic message and an amplitude value, associated to the same frequency, of the reference spectrum is greater than or equal to a threshold, a dysfunction is detected. Alternatively, the compared values are values showing the amplitudes of the same frequency range, respectively from the reference spectrum and the diagnostic message.

If at least one acceleration value measured during movement operations 210 and 230 is greater than or equal to a predetermined threshold, control module 25 detects a shock of robot 15 or atomizer 20.

Control module 25 signals any detected dysfunction or shock to the operator, for example via a corresponding display on a screen.

Each detected shock is associated, on the screen, to the date of the shock, estimated from the time stamp of each acceleration value greater than or equal to the threshold. For example, a position of robot 15 at the time of the shock is displayed on the screen.

Maximum and minimum measured temperature values are also displayed on the screen.

Note that if communication module 75 is configured to transmit the diagnostic message to a device separate from first station 35, for example directly to control module 25, transfer operation 240 may be performed while atomizer 20 is not in the rest position; for example while moving atomizer 20 from the operating position to the rest position.

Since the electrical potential reference point of measurement module 30 is electrically connected to atomizer head 45, measurement module 30 allows the parameter values of atomizer 20 to be measured during operation of atomizer 20, particularly when atomizer head 45 is brought to a high electrical potential in relation to the rest of installation 10. Thus, measurement module 30 allows maintenance of installation to be carried out as soon as a malfunction of atomizer 20 is detected. In addition, performing measurements while atomizer head 45 is at a high electrical potential allows access to information that would not otherwise be available, for example, to detect a shock taking place at that time, and also avoids slowing down the operation of the installation by providing a specific time range for performing the measurements.

It should be noted that measurement module 30 includes sensors 60 that are also likely to be used in installations wherein the electrical potential of atomizer 20 is not changed during atomizing, and therefore allows better detection of dysfunctions or incidents related to atomizer 20. In this case, the reference point of the electrical potentials is not necessarily connected to atomizer head 45.

Measurement module 30 integrated in a ring surrounding the connecting face between base 40 and atomizer head 45 allows measurement module 30 to be adapted to existing installations with a minimum of modifications to base 40 and/or atomizer head 45, since rings are already provided at this location to protect the valves passing through the connecting face.

Attaching the various components 60, 65, 70, 75 of measurement module 30 to the inner face of the ring makes manufacturing of measurement module 30 easier, while making it easy to install and allowing for high accuracy of the measurements performed.

The support of ring 80 of measurement module 30 against skirt 50 makes it possible to measure the parameters of skirt 50 easily, particularly its temperature, and to measure with great precision the parameters of atomizer 20 because of the large contact surface between atomizer 20 and measurement module 30.

Electrically connecting the reference point of measurement module to skirt 50 allows the reference point to be set to the same potential as atomizer head 45 simply and reliably.

By measuring acceleration of atomizer 20 with an accelerometer of measurement module 30, shocks to robot 15 or to atomizer 20 may be detected, as well as dysfunction of atomizer 20, particularly an imbalance of bowl 55 due to a deformation of bowl 55 as a result of a shock, or a dysfunction of turbine 56.

Measuring acceleration during a movement of atomizer 20 allows, particularly, to detect a shock during this movement and thus to adapt the trajectory of robot 15 if necessary. For this, by comparing acceleration values with a threshold, a shock may be detected in a simple way.

By measuring acceleration during a rotation of bowl 55, an imbalance in bowl 55 may be detected.

Measuring temperature of atomizer 20 allows detection of excessive cooling due to expansion of gases used to shape the jet of fluid F or to drive turbine 56 in rotation, and thus to prevent the condensation of water vapor on atomizer 20 from having harmful effects on the quality of the part that is to be coated with fluid F, either by interfering with atomization or by droplets of water falling on the part. Measuring temperature of skirt 50 provides reliable information showing the condition of atomizer 20, since skirt 50 represents a large part of the surface of atomizer head 45.

A microphone may also be used to detect an imbalance of bowl 55, for example a deformation of bowl 55 or a spatial disorientation with respect to axis A1, from the noise emitted by bowl 55 during its rotation.

Figure 5:
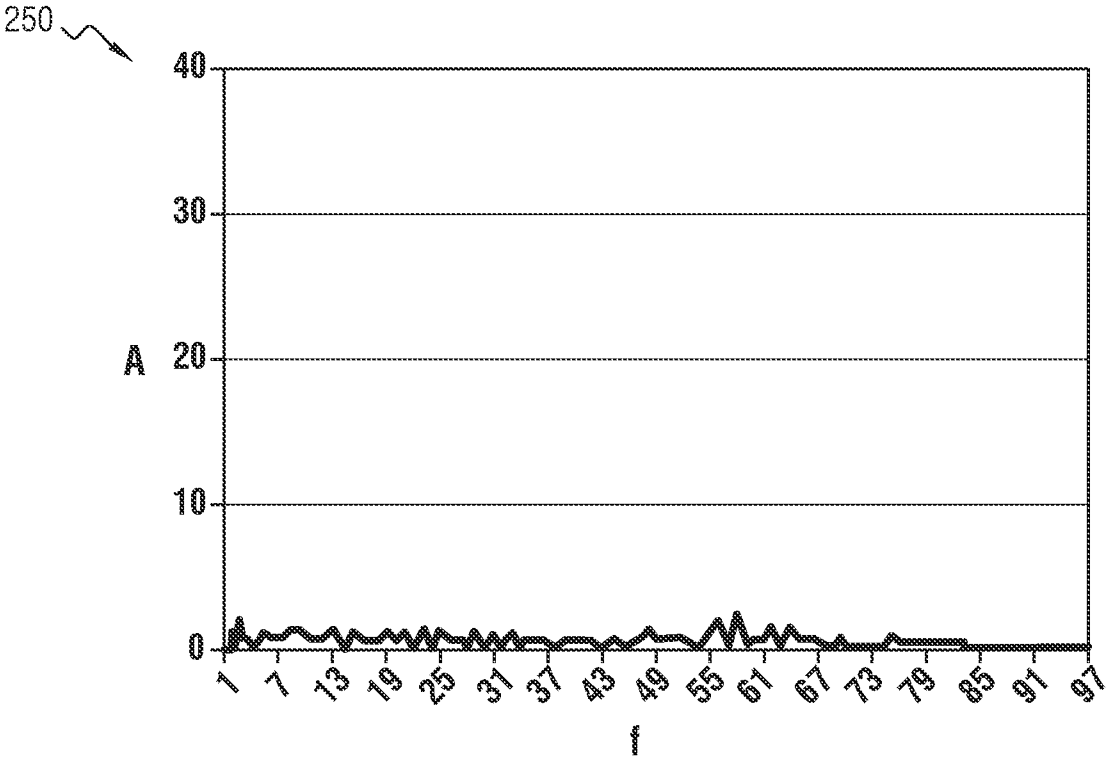
FIG. 5 is a frequency spectrum of a noise acquired by a microphone in the measurement module in FIG. 3, corresponding to a non-defective atomizer.

In particular, FIG. 5 shows a graph 250 of a frequency spectrum of the noise measured during rotation of a non-defective bowl 55 at 25,000 rpm. Particularly, an amplitude A (in arbitrary units) of frequency components of the measured noise is shown as a function of the frequency f (in arbitrary units).

Figure 6:
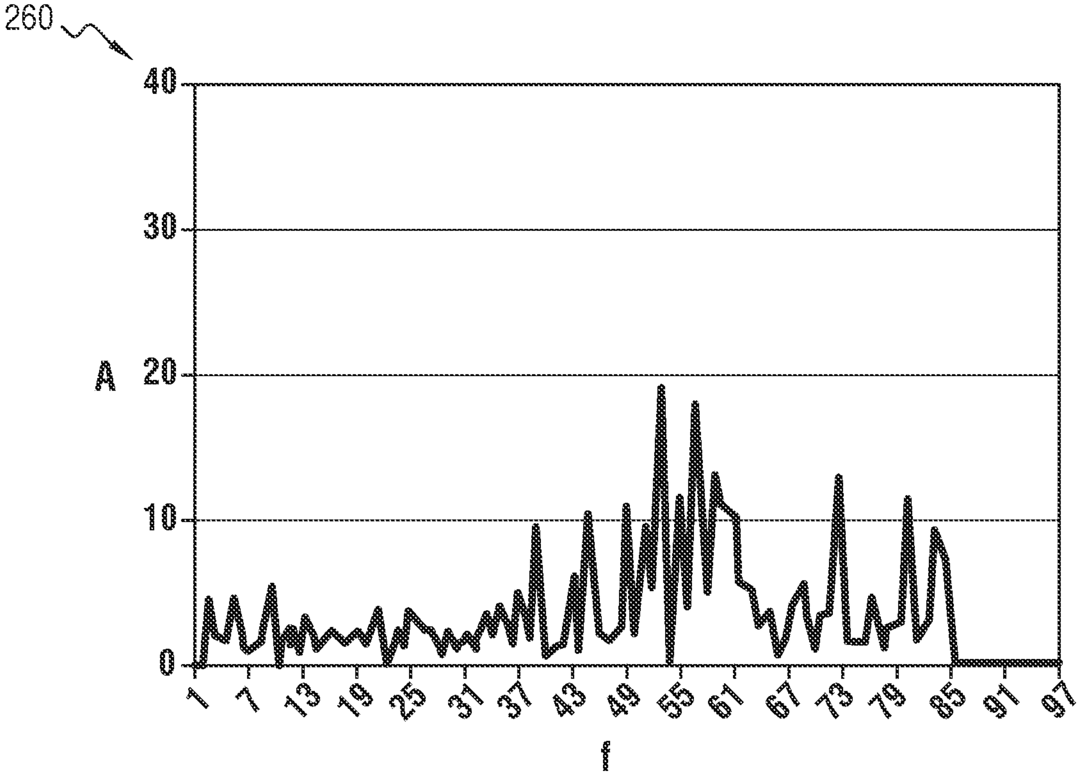
FIG. 6 is a frequency spectrum of a noise acquired by a microphone in the measurement module in FIG. 3, corresponding to a defective atomizer.

FIG. 6 shows a graph 255 of a frequency spectrum of the noise measured during rotation of a defective bowl 55 at 25,000 rpm. Particularly, an amplitude A (in arbitrary units) of frequency components of the measured noise is shown as a function of frequency f. It thus appears that the comparison of the two spectra, and particularly the comparison at a threshold of one or more differences, each difference being a difference between amplitudes associated with the same frequency, allows the detection of a defective bowl 55.

The integration of receiver module 125 at first station 35 allows an existing installation to be easily adapted and allows transfer of information from the measurement without additional loss of time during cleaning of atomizer 20. The use of a radio frequency diagnostic message also reduces the need for modifications to installation 10, since the trajectory of atomizer 20 does not have to be changed to make contact with electrical connectors to transfer the diagnostic message. This limits the risk of arcing or soiling of installation 10.

If, on the other hand, the diagnostic message is transmitted by an electrical signal, the power consumption of measurement module 30 is limited.

The presence of storage device 105 and its charging by station 35, in particular by induction, again minimizes the need for adjustments to installation 10.

A second example of installation 10 will now be described. The elements identical to the first example are not described again. Only the differences are highlighted.

Figure 7:
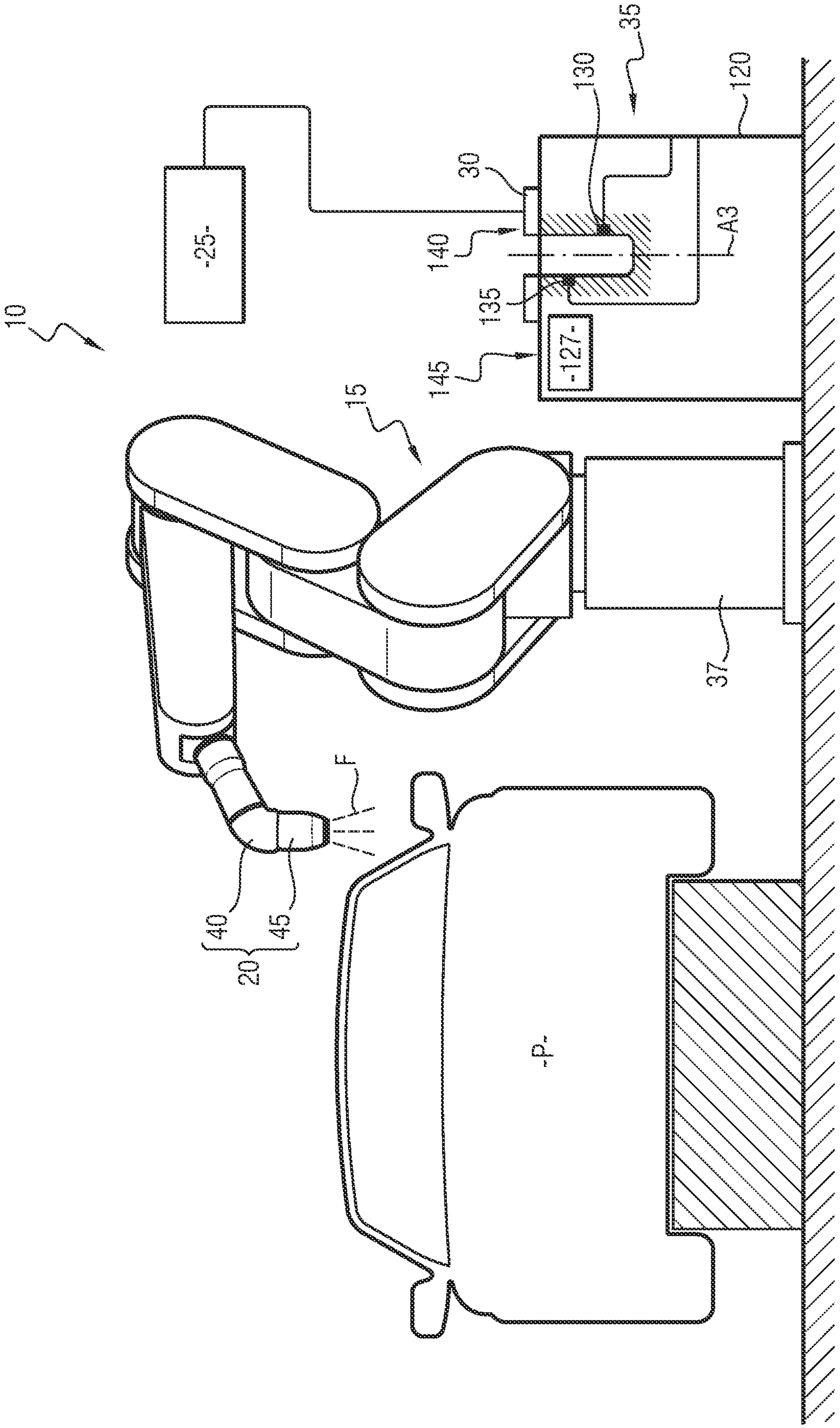
FIG. 7 is a schematic representation of a second example of a fluid projection installation according to the invention.

The second example of installation 10 is shown in FIG. 7.

The second example of installation 10 may contain an atomizer 20 whose electrical potential is not changed during operation, for example an atomizer connected to ground during atomizing.

Measurement module 30 is connected to first station 35. In particular, measurement module 30 is not mounted on or connected to atomizer 20.

Robot 15 is able to move atomizer 20 in relation to measurement module 30.

When atomizer 20 is in the rest position, a distance between atomizer 20 and measurement module 30 is less than or equal to 20 centimeters. For example, atomizer 20 is in contact with first station 35, in particular with measurement module 30. In particular skirt 50 is in contact with measurement module 30 when atomizer 20 is in the rest position.

Measurement module 30 is configured to measure values of the atomizer parameters when atomizer 20 is in the rest position.

Measurement module 30 at least partially surrounds axis A3 of opening 140. In particular, measurement module 30 at least partially surrounds atomizer 20 when atomizer 20 is in the rest position.

Housing 80 of measurement module 30 forms a ring, for example at least partially defining opening 140 in a plane perpendicular to axis A3. The ring then forms, for example, an inner wall of first station 35.

Alternatively, housing 80 forms a ring partially surrounding axis A3, for example over an angle of 240 degrees or less. It is noted that the positioning and shape of housing 80 may vary.

In particular, each sensor 60 is attached to the ring. For example, each sensor 60 is carried by and attached to the ring.

For example, each sensor 60 is fixed to wall 85 of the ring that defines opening 140. In particular, each sensor 60 is arranged radially outside wall 85 of the ring that defines opening 140. Thus, the sensors 60 are protected against possible splashes and electrically isolated from the rest of the installation by wall 85.

The temperature sensor is, for example, configured to be in contact with atomizer head 45, particularly skirt 50, when atomizer 20 is in the rest position. The temperature sensor extends, in particular, through the ring formed by housing 80.

Each accelerometer is configured to measure acceleration values of first station 35, in particular of measurement module 30.

A method for measuring at least one parameter of atomizer 20, implemented by the second installation example 10, will now be described.

The method includes an atomizing operation 220, a movement operation 230 and a measuring operation.

In atomizing operation 220, atomizer 20, in its operating position, atomizes fluid F.

In atomizing operation 220, atomizer head 45 has the second electrical potential value.

For example, in a manner known per se, a potential difference equal to the second electrical potential value is imposed between an object P that is to be coated with fluid F and atomizer head 45. In particular, object P is grounded.

In order to atomize fluid F, bowl 55 is rotated around its axis and fluid F is injected into bowl 55 to generate the jet of fluid F. In addition, skirt 50 generates gas jets G intended to shape the jet of fluid F.

In movement operation 230, atomizer 20 is moved by robot 15 from the operating position to the rest position. In addition, the electrical potential of atomizer 20 is changed from the second value to the first value.

During the measurement operation, bowl 55 is rotated around its axis. For example, the control module controls the rotation of bowl 55. Acceleration values of first station 35 are measured by each accelerometer during rotation of bowl 55.

In addition, at least one temperature value of atomizer head 45, in particular of skirt 50, is measured by a temperature sensor when atomizer 20 is in the rest position.

The diagnostic values are generated in a similar way to the first installation example, the acceleration values used are acceleration values of first station 35 and not acceleration values of atomizer 20.

Placing measurement module 30 in first station 35 simplifies measurement module 30, which no longer has to be connected to high voltage. In addition, measurement module 30 does not need to carry an electrical energy storage device 105.

Furthermore, it is not necessary to modify an already existing atomizer 20 to allow measurement of parameters.

In addition, measurement module 30 may also transmit the information in a wired analog way or via a wired network, which has the advantage of being less subject to the surrounding electromagnetic constraints than a wireless transmission.

The calculation and local storage of faults in the microprocessor embedded in control module 70 is no longer necessary.

Finally, measurement module 30 located in first station 35 is not subject to overspray (i.e., fluid splashes) that would occur during the application.

If first station 35 is a station used for cleaning and/or filling atomizer 20, installation 10 may be easily obtained by limited modification of an existing installation.

When measurement module 30 forms a ring 80 surrounding atomizer 20 when the latter is in the second position, numerous sensors 60 can be brought into contact with atomizer 20, in particular when sensors 60 are attached to the wall of ring 80 which defines the opening.

In addition, measurement module 30 may be installed on a cleaning station 35 of a known type, by arranging measurement module 30 in such a way that measurements are taken when atomizer 20 is in the position in which it is cleaned.

In particular, a microphone may be used to detect a dysfunction of bowl 55 even if there is no contact between atomizer 20 and first station 35. This makes the measurement exceptionally reliable as it does not depend on the quality of the support between atomizer 20 and first station 35.

When first station 35 is separate from the station used for cleaning and/or filling atomizer 20, first station 35 may be used to measure parameters of the atomizer that would be incompatible with too close a proximity to this cleaning station, for example the measurement of the second electrical potential value. Indeed, first station 35 may be electrically isolated from the rest of installation 10, much more easily than such isolation of the cleaning station would be.

The measurement of the electrical potential of atomizer 20 allows detection of dysfunctions related to the power supply of atomizer head 45, in particular a drift of the second electrical potential value which could lead to imperfect atomizing if the second value is too low.

The use of a first station 35 able to move measurement module 30 allows such an isolation in an easy way, since in particular measurement module 30 is likely to be moved away from the other devices of installation 10 when it is brought closer or brought into contact with atomizer 20 to carry out the measurement.

The use of a station 35 fixed in the reference frame of installation simplifies installation 10.

According to a variant of the second example, measurement module 30 is not coaxial with opening 140. For example, measurement module 30 is arranged on a lateral face of first station 35. In this case, the rest position is not a cleaning position. Atomizer 20 is cleaned and/or filled with fluid F in a cleaning position in which measurement module 30 is at least partially housed in opening 140.

This variant may be easier to integrate depending on the dimensions of atomizer 20 and first existing stations 35.

According to another variant, measurement module 30 is not in contact with atomizer 20 when atomizer 20 is in the rest position.

In this case, measurement module 30 is, for example, without an accelerometer.

At least one sensor 60 is, for example, configured to measure an acceleration, speed or displacement of atomizer 20 without contact with atomizer 20, for example by reflection of a laser beam on the outer surface of the atomizer.

Alternatively, or in addition, at least one sensor 60 is configured to measure a noise emitted by bowl 55 during its rotation.

Each temperature sensor is, for example, configured to measure a temperature of atomizer 20, in particular of skirt 50, by measuring an infra-red radiation emitted by atomizer 20.

Figure 8:
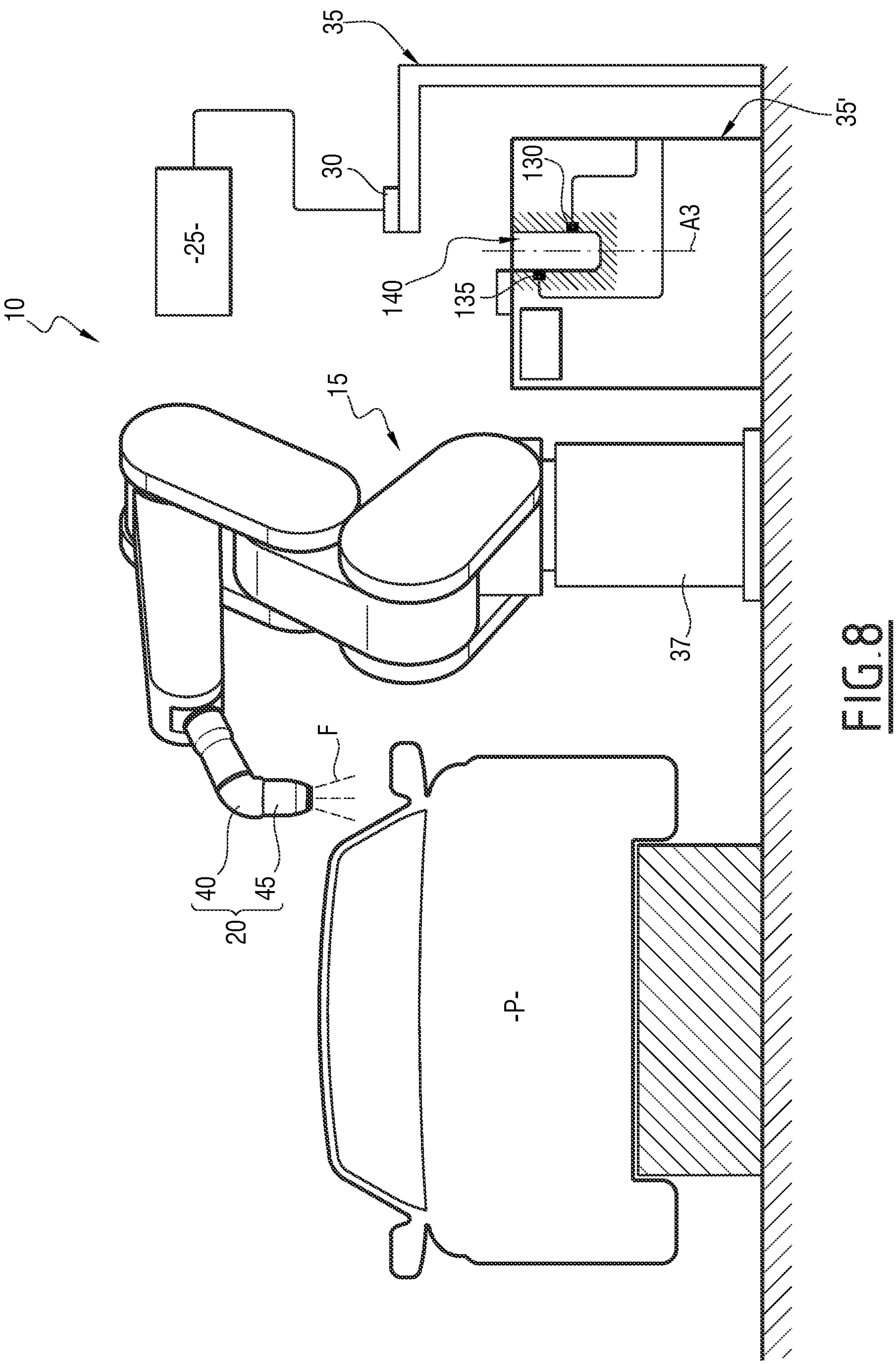
FIG. 8 is a schematic representation of a third example of a fluid projection installation, according to the invention.

According to a third example of installation 10, installation 10 incudes, in addition to first station 35, a second station 35'. The third example if installation 10 is shown in FIG. 8.

First station 35 contains measurement module 30. For example, measurement module 30 is mounted on a movable arm of first station 35, first station 35 being configured to move measurement module 30 between a first position in which measurement module 30 is remote from atomizer 20 when the atomizer is in the rest position and a second position in which measurement module 30 is in contact with atomizer 20 when the atomizer is in the rest position.

The second station 35' is, for example, fixed in relation to base 37 of robot 15.

The second station 35' has opening 140, cleaning nozzle 130, and filling connector 135.

Measurement module 30 includes, for example, in addition to sensors 60 already mentioned, a sensor 60 configured to measure an electrical potential value of atomizer 20 when measurement module 30 is in contact with atomizer 20.

A method for measuring at least one parameter of atomizer 20, implemented by the third example of installation 10, will now be described.

Figure 9:
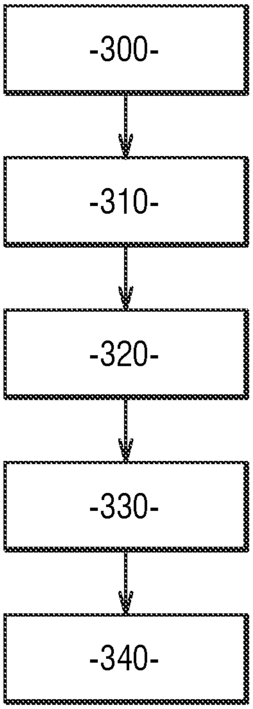
FIG. 9 is a flowchart of the operations in a method implemented by the installation in FIG. 8.

The method includes an atomizing operation 300, a first movement operation 310, a measurement operation 320 and, optionally, a second movement operation 330, and a maintenance operation 340. A flowchart of the operations in this method is shown in FIG. 9.

Note that the order of operations 300 to 340 is subject to change. In atomizer operation 300, atomizer 20, in its operating position, atomizes fluid F.

In atomizing operation 300, atomizer head 45 has the second electrical potential value.

For example, in a manner known per se, a potential difference equal to the second electrical potential value is imposed between an object P that is to be coated with fluid F and atomizer head 45. In particular, the object P is grounded.

In order to atomize fluid F, bowl 55 is rotated around its axis and fluid F is injected into bowl 55 to generate the jet of fluid F. In addition, the skirt generates gas jets G intended to shape the jet of fluid F.

In first movement operation 310, atomizer 20 is moved by robot from the operating position to the rest position. In addition, measurement module 30, if mobile, is moved to its second position.

The electrical potential of atomizer 20 remains fixed at the second value by base 40 of atomizer 20 during first movement operation 310.

At least one value of the electric potential of atomizer 20, in particular the electric potential of skirt 50, is measured during measurement operation 320. In particular, the second electric potential value is measured.

After the measurement of the value of the electric potential, the electric potential of atomizer 20 is changed from the second value to the first value.

In measurement operation 320, bowl 55 is rotated around its axis. For example, control module 55 controls the rotation of bowl 55.

Acceleration values of measurement module 30 are measured by each accelerometer during rotation of bowl 55.

In addition, at least one temperature value of atomizer head 45, in particular of skirt 50, is measured by a temperature sensor when atomizer 20 is in the rest position.

The diagnostic values are generated in a similar way to the first installation example, with the acceleration values used being acceleration values from first station 35 and not acceleration values from atomizer 20.

After measurement operation 320, atomizer 20 is moved by robot to a cleaning position in which atomizer 20 is at least partially housed in opening 140 of second station 35'.

Atomizer 20 is cleaned and/or the reserve filled with fluid F in maintenance operation 340 in a manner known per se.

The third example particularly allows the electrical potential to be measured, in particular when the electrical potential has the second value, even if this second value is extremely high compared to the rest of installation 10. Since measurement module 30 is not integrated into the station intended to clean atomizer 20 or fill the reserve but in a dedicated station 35, this station 35 is easier to isolate from the rest of installation 10.

According to a variant, at least two first stations 35 are present. For example, one of first stations 35 includes electrical potential sensor 60, and the other first station 35, or second station 35', includes the other sensors 60. This embodiment limits, in particular, the risk that the high potential of atomizer 20 will cause damage to other sensors 60 or related devices.

It should be noted that in the second or third example, the measurement of a potential value by a station 35 is optional. Depending on the possible embodiments, the values of other parameters of the atomizer are carried out, without a potential value being measured.

The invention claimed is:

1. An installation comprising:

an atomizer configured to atomize a fluid, comprising:
- a skirt for generating air flows for conforming the atomized fluid;
- a turbine;
- a fluid injector; and
- a bowl rotated by said turbine to atomize the fluid when the fluid is injected into the bowl by said fluid injector;

a robot configured to move said atomizer in a predetermined reference frame between at least a first position and a second position, said atomizer being configured to atomize the fluid when said atomizer is in the first position; and a first station;

a measurement module, installed on the first station so as to be attached to the first station, comprising:
- a housing, forming a ring defining an opening surrounded by the ring, said atomizer being at least partially accommodated in the opening when said atomizer is in the second position, wherein said ring has an inner wall delimiting the opening;
- at least one sensor attached to the inner wall and configured to measure at least one value of a parameter of said atomizer when said atomizer is in the second position, a distance being defined between said atomizer and said first station, the distance when the atomizer is in the second position being strictly less than the distance when the atomizer is in the first position, and wherein said skirt is in contact with said measurement module when said atomizer is in the second position; and a control module detecting a defect of said atomizer, on the basis of values measure by said at least one sensor during a rotation of said bowl when said atomizer is in the second position.

2. The installation according to claim 1, wherein said control module controls rotation of said bowl when said atomizer is in the second position.

3. The installation according to claim 1, wherein said at least one sensor comprises a microphone, or wherein said at least one sensor comprises an accelerometer configured to measure a value of an acceleration of said measurement module when said atomizer is in the second position, said acceleration being caused by an acceleration of said skirt of said atomizer being in contact with said measurement module when said atomizer is in the second position.

4. The installation according to claim 1, wherein said at least one sensor is a microphone.

5. The installation according to claim 1, wherein said atomizer further comprises at least one valve comprising a needle movable between two positions, and wherein the at least one sensor of said first station measures a position of said valve needle.

6. The installation according to claim 5, wherein said control module calculates a time duration of movement of said needle between its two positions from the measured needle position values.

7. The installation according to claim 1, wherein said first station is configured to clean said atomizer with a liquid when said atomizer is in the second position.

8. The installation according to claim 1, further comprising a second station, separate from said first station, said robot being further configured to move said atomizer from one of the first and second positions to a third position, said second station being configured to clean said atomizer with a liquid, when said atomizer is in the third position.

9. The installation according to claim 1, wherein said first station is fixed in the predetermined reference frame.

10. The installation according to claim 1, wherein at least one of said at least one sensor measures a value of a temperature of said atomizer.

11. The installation according to claim 1, wherein at least one of said at least one sensor measures a value of an electric potential of the atomizer.

12. The installation according to claim 1, further comprising a second station, separate from said first station, said robot being further configured to move said atomizer from one of the first and second positions to a third position, said second station being configured to clean said atomizer with a solvent, when said atomizer is in the third position.

* * * * *